United States Patent
Bajaj et al.

(10) Patent No.: US 7,966,180 B2
(45) Date of Patent: Jun. 21, 2011

(54) METHODS, SYSTEMS, AND COMPUTER PROGRAM PRODUCTS FOR SPOKEN LANGUAGE GRAMMAR EVALUATION

(75) Inventors: Rajni Bajaj, Gurgaon (IN); Sreeram V. Balakrishnan, Los Altos, CA (US); Mridula Bhandari, Gurgaon (IN); Lyndon J. D'Silva, Gurgaon (IN); Sandeep Jindal, Manimajra (IN); Pooja Kumar, New Delhi (IN); Nitendra Rajput, New Delhi (IN); Ashish Verma, New Delhi (IN)

(73) Assignee: Nuance Communications, Inc., Burlington, MA (US)

( * ) Notice: Subject to any disclaimer, the term of this patent is extended or adjusted under 35 U.S.C. 154(b) by 342 days.

(21) Appl. No.: 12/055,623

(22) Filed: Mar. 26, 2008

(65) Prior Publication Data
US 2009/0070111 A1   Mar. 12, 2009

Related U.S. Application Data

(63) Continuation of application No. 11/853,076, filed on Sep. 11, 2007, now abandoned.

(51) Int. Cl.
*G10L 15/26* (2006.01)
(52) U.S. Cl. .................... 704/235; 704/231; 704/170
(58) Field of Classification Search ............... 704/244, 704/255, 231, 235, 251, 257, 9, 10, 239, 704/340, 270, 270.1, 238, 240
See application file for complete search history.

(56) References Cited

U.S. PATENT DOCUMENTS

| | | | |
|---|---|---|---|
| 5,540,589 A | 7/1996 | Waters | |
| 5,717,828 A | 2/1998 | Rothenberg | |
| 6,224,383 B1 | 5/2001 | Shannon | |
| 6,985,862 B2 * | 1/2006 | Strom et al. | 704/255 |
| 7,440,895 B1 * | 10/2008 | Miller et al. | 704/244 |
| 2002/0086268 A1 | 7/2002 | Shpiro | |
| 2005/0281395 A1 | 12/2005 | Wescott | |

FOREIGN PATENT DOCUMENTS
WO   WO2006130841   12/2006

OTHER PUBLICATIONS

Kiyotaka Uchimoto, et al., Text Generation from Keywords, Proc. COLING, 2002, 7 pages.
John Lee, et al., Automatic Grammar Correction for Second-Language Learners, Interspeech—ICSLP (Pittsburgh) Sep. 17-21, 2006, pp. 1978-1981.

* cited by examiner

*Primary Examiner* — Huyen X. Vo
(74) *Attorney, Agent, or Firm* — Wolf, Greenfield & Sacks, P.C.

(57) ABSTRACT

A method, system, and computer program product for spoken language grammar evaluation are provided. The method includes playing a recorded question to a candidate, recording a spoken answer from the candidate, and converting the spoken answer into text. The method further includes comparing the text to a grammar database, calculating a spoken language grammar evaluation score based on the comparison, and outputting the spoken language grammar evaluation score.

23 Claims, 3 Drawing Sheets

METHODS, SYSTEMS, AND COMPUTER PROGRAM PRODUCTS FOR SPOKEN LANGUAGE GRAMMAR EVALUATION

CROSS-REFERENCE TO RELATED APPLICATION

This application is a continuation of U.S. patent application Ser. No. 11/853,076, filed Sep. 11, 2007, the disclosure of which is incorporated by reference herein in its entirety.

BACKGROUND OF THE INVENTION

The present disclosure relates generally to linguistic analysis, and, in particular, to spoken language grammar evaluation.

Written and spoken language grammar skills of a person are often uncorrelated. This is due to the fact that there are several factors that exist in the spoken form of the language and not in the written form, such as spontaneity, no visual help, and just-in-time sentence composition. Therefore, written grammar tests may not be suitable to judge the spoken grammar skills of people.

In today's global world, where people with differing native languages are required to converse in foreign languages, it would be beneficial to develop an automated approach to improve people's conversational language skills through interactive grammatical analysis. Accordingly, there is a need in the art for automated spoken language grammar evaluation.

BRIEF SUMMARY OF THE INVENTION

Embodiments of the invention include a method for spoken language grammar evaluation. The method includes playing a recorded question to a candidate, recording a spoken answer from the candidate, and converting the spoken answer into text. The method further includes comparing the text to a grammar database, calculating a spoken language grammar evaluation score based on the comparison, and outputting the spoken language grammar evaluation score.

Additional embodiments include a system for spoken language grammar evaluation. The system includes a host system in communication with a user system, where the user system provides audio input and output for a candidate. The system further includes a grammar database in communication with the host system, and a grammar assessment tool (GAT) executing upon the host system. The GAT sends a recorded question to the candidate. The user system plays the recorded question and records a spoken answer. The GAT receives the spoken answer from the candidate, and initiates a conversion of the spoken answer into text. The GAT further compares the text to the grammar database, calculates a spoken language grammar evaluation score based on the comparison, and outputs the spoken language grammar evaluation score.

Further embodiments include computer program product for spoken language grammar evaluation. The computer program product includes a storage medium readable by a processing circuit and storing instructions for execution by the processing circuit for implementing a method. The method includes sending a recorded question to a candidate, receiving a spoken answer from the candidate, and initiating a conversion of the spoken answer into text. The method further includes comparing the text to a grammar database, calculating a spoken language grammar evaluation score based on the comparison, and outputting the spoken language grammar evaluation score.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments, as shown and described by the various figures and the accompanying text, provide methods, systems and computer program products for spoken language grammar evaluation. In exemplary embodiments, a question or sentence is played as audio content to a candidate, and spoken utterances of the candidate, in response thereto, are evaluated for grammatical correctness. Here, a "candidate" refers to a user whose spoken language grammar is under evaluation. A speech recognition system may be employed to convert the candidate's speech into text. In general, speech recognition systems can be error prone, such that converted text generated by a speech recognition system may not be exactly what the candidate said. Thus, performing a grammar test based only on the text as generated by the speech recognition system may provide incorrect results. In exemplary embodiments, the candidate's sentences are restricted through making the candidate listen to a sentence, and then prompting the candidate to speak a grammatically correct version of the sentence. This technique ensures that the sentence spoken by the candidate is among the sentences that can be correctly converted to text by the speech recognition system. Moreover, this method may increase spoken language grammar evaluation accuracy. Further, since the entire evaluation can be performed as spoken interactions, factors such as spontaneity, just-in-time sentence composition, and other such factors are incorporated in evaluating the candidate's spoken language grammar.

Figure 1:
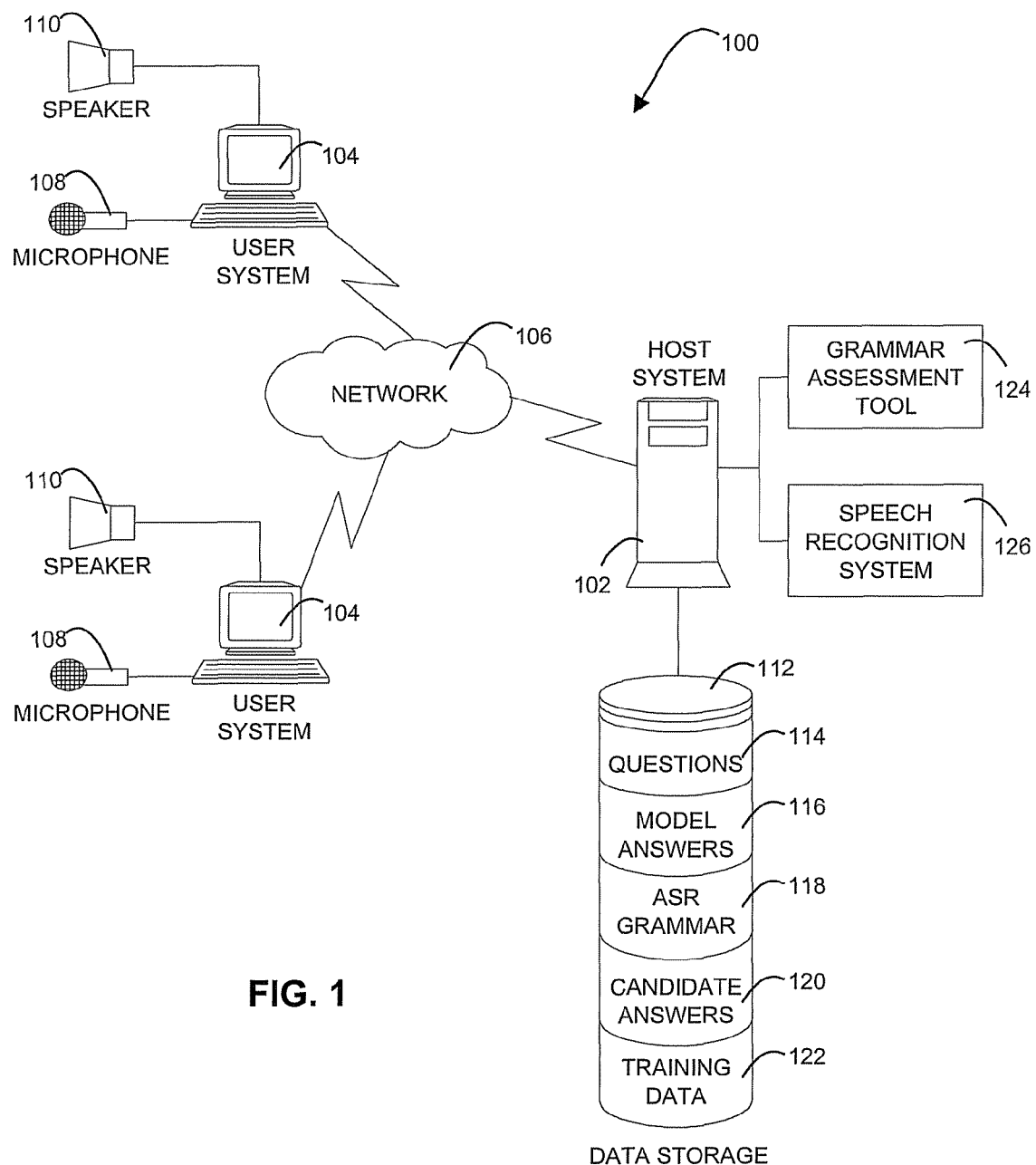
FIG. 1 illustrates one example of a block diagram of a system upon which spoken language grammar evaluation may be implemented in exemplary embodiments.

Turning now to the drawings, it will be seen that in FIG. 1 there is a block diagram of a system 100 upon which spoken language grammar evaluation is implemented in exemplary embodiments. The system 100 of FIG. 1 includes a host system 102 in communication with user systems 104 over a network 106. In exemplary embodiments, the host system 102 is a high-speed processing device (e.g., a mainframe computer) including at least one processing circuit (e.g., a CPU) capable of reading and executing instructions, and handling numerous interaction requests from the user systems 104. The host system 102 may function as an application server, a database management server, and/or a web server. The user systems 104 may comprise desktop, laptop, or general-purpose computer devices that provide an interface for candidates to perform spoken language grammar evaluation. System administrators of the host system 102 may also access the host system 102 via the user systems 104, performing such tasks as developing grammar test content. While only a single host system 102 is shown in FIG. 1, it will be understood that multiple host systems can be implemented, each in communication with one another via direct coupling or via one or more networks. For example, multiple host systems may be interconnected through a distributed network architecture. The single host system 102 may also represent a cluster of hosts collectively performing processes as described in greater detail herein. In alternate exemplary embodiments, the host system 102 is integrated with a user system 104 as a single personal computer or workstation.

In exemplary embodiments, the user systems 104 interface with audio input and output devices, such a microphone 108 and a speaker 110. In alternate exemplary embodiments, the user systems 104 are mobile devices, such as Web-enabled wireless phones, with the microphone 108 and speaker 110 integrated into the user systems 104. Using the microphone 108, a candidate may record responses to questions or other statements output via the speaker 110. The user systems 104 may include Web browsing software and/or other communication technologies to exchange information with the host system 102 via the network 106.

The network 106 may be any type of communications network known in the art. For example, the network 106 may be an intranet, extranet, or an internetwork, such as the Internet, or a combination thereof. The network 106 can include wireless, wired, and/or fiber optic links.

In exemplary embodiments, the host system 102 accesses and stores data in a data storage device 112. The data storage device 112 refers to any type of storage and may comprise a secondary storage element, e.g., hard disk drive, tape, or a storage subsystem that is internal or external to the host system 102. Types of data that may be stored in the data storage device 112 include files and databases, such as audio and textual information. It will be understood that the data storage device 112 shown in FIG. 1 is provided for purposes of simplification and ease of explanation and is not to be construed as limiting in scope. To the contrary, there may be multiple data storage devices 112 utilized by the host system 102. In support of spoken language grammar evaluation, the data storage device 112 may store questions 114, model answers 116, answer speech recognition (ASR) grammar 118, candidate answers 120, and training data 122, as further described herein.

In exemplary embodiments, the host system 102 executes various applications, including a grammar assessment tool (GAT) 124 and a speech recognition system (SRS) 126. An operating system and other applications, e.g., business applications, a web server, etc., may also be executed by the host system 102 as dictated by the needs of the enterprise of the host system 102. In exemplary embodiments, the GAT 124 performs spoken language grammar evaluation in response to a request received from the user systems 104. The GAT 124 may send the questions 114 to the user systems 104 to elicit spoken responses from candidates. The spoken responses are returned to the host system 102 and may be stored as the candidate answers 120. In exemplary embodiments, the SRS 126 converts the candidate answers 120 from speech into text.

The GAT 124 may compare the text output of the SRS 126 to the ASR grammar 118 as developed using the model answers 116, and calculate an associated spoken language grammar evaluation score. The GAT 124 may also calculate a total weighted spoken language grammar evaluation score as a summation of multiple responses from a candidate, weighted relative to the difficulty of each question as determined from the training data 122. In alternate exemplary embodiments, the SRS 126 performs the comparison of converted text to the ASR grammar 118, and calculates the spoken language grammar evaluation score.

Although the GAT 124 and the SRS 126 are shown as separate applications executing on the host system 102, it will be understood that the applications may be merged or further subdivided as a single application, multiple applications, or any combination thereof. Moreover, while described as applications, the GAT 124 and the SRS 126 can be implemented as plug-ins, applets, modules, scripts, or other such formats known in the art. In alternate exemplary embodiments, the processing associated with the GAT 124 and the SRS 126 is split between the host system 102 and the client systems 104, e.g., a distributed computing architecture. In alternate exemplary embodiments, the host system 102 accesses the SRS 126 over the network 106 (e.g., the Internet), if the SRS 126 is available as a hosted service on another networked system (not depicted). The details of developing a spoken language grammar test and a process for spoken language grammar evaluation are further provided herein.

Figure 2:
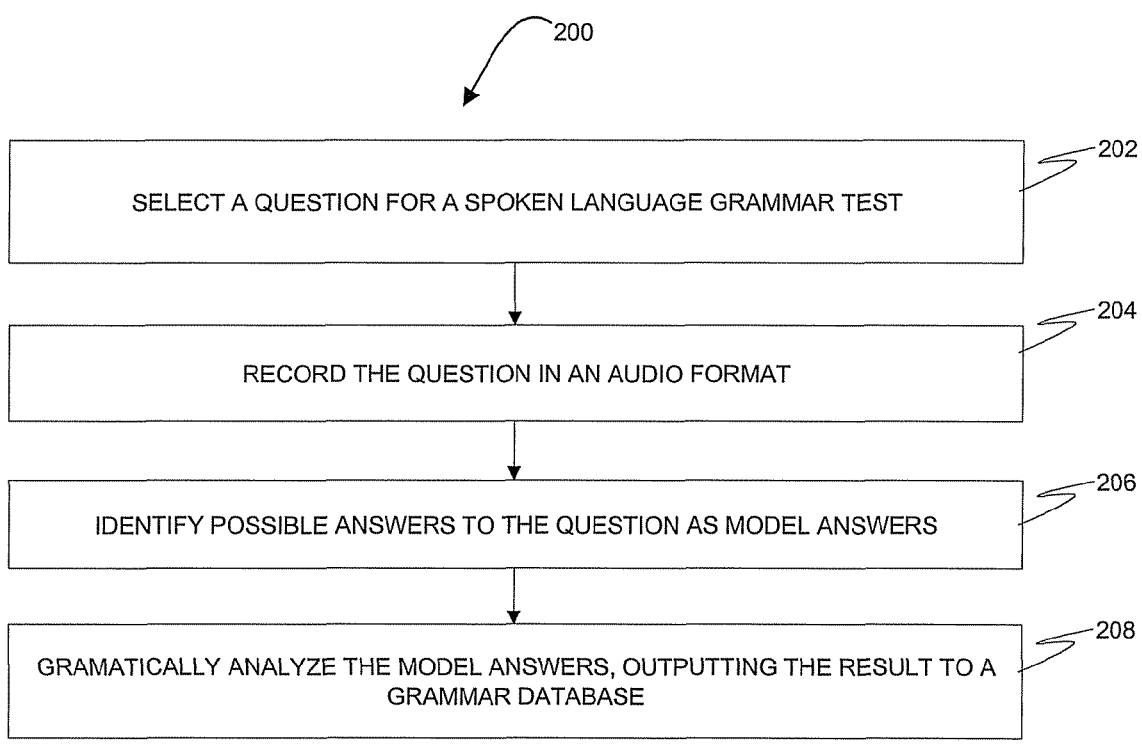
FIG. 2 illustrates one example of a flow diagram describing a process for spoken language grammar test development in accordance with exemplary embodiments.

Turning now to FIG. 2, a process 200 for spoken language grammar test development will now be described in accordance with exemplary embodiments, and in reference to the system 100 of FIG. 1. An administrator can perform the process 200 to configure the data stored in the data storage device 112 for spoken language grammar testing. At block 202, a question is selected for the spoken language grammar test. Here, a "question" may be any statement that elicits a candidate response, but the question need not be in the form of an inquiry. At block 204, the question is recorded in an audio format. The recorded question may be written to the questions 114 for use during grammar testing. At block 206, possible text answers to the question are identified. The possible answers may include both grammatically correct and incorrect answers that are anticipated. For example, a question could be, "I am owning a big car." Possible answers could include those listed in table 1.

TABLE 1

Possible Answers

| MODEL ANSWERS | CORRECT? |
| --- | --- |
| I am owning a big car. | No. |
| I own a big car. | Yes. |
| I have a big car. | Yes. |
| I owe a big car. | Yes. |
| I am driving a big car. | Yes. |
| I drive a big car. | Yes. |

The possible answers can be manually generated. In alternate exemplary embodiments, the possible answers are automatically generated using a technique known in the art, such as the techniques taught by Uchimoto, K., Sekine, S. and Isahara, H., "Text Generation from Keywords," *Proc. COLING,* 2002; and/or John Lee and Stephanie Seneff, "Automatic Grammar Correction for Second-Language Learners," *Interspeech—ICSLP* (Pittsburgh) 17-21 Sep. 2006. In exemplary embodiments, the possible answers are stored in the model answers 116. At block 208, the model answers 116 are grammatically analyzed and the results are written to a grammar database, i.e., the ASR grammar 118. Grammatical analysis may include coming up with a list of correct, as well as possible incorrect answers. Having explicit incorrect answers in the list can help to increase evaluation confidence when one of the answers in the list is recorded. It can be seen that the speech recognition grammar encapsulates a list of numerous possible ways that a sentence (i.e., the question) can be made grammatically correct. Grammatically incorrect answers may be written to the ASR grammar 118 and flagged as incorrect to assist in determining whether the candidate's grammar under analysis is correct or incorrect. The process 200 can be repeated to generate a set of questions 114 and possible answers to form one or more grammar tests, with additional model answers 116 and ASR grammar 118 written to the data storage device 112.

Figure 3:
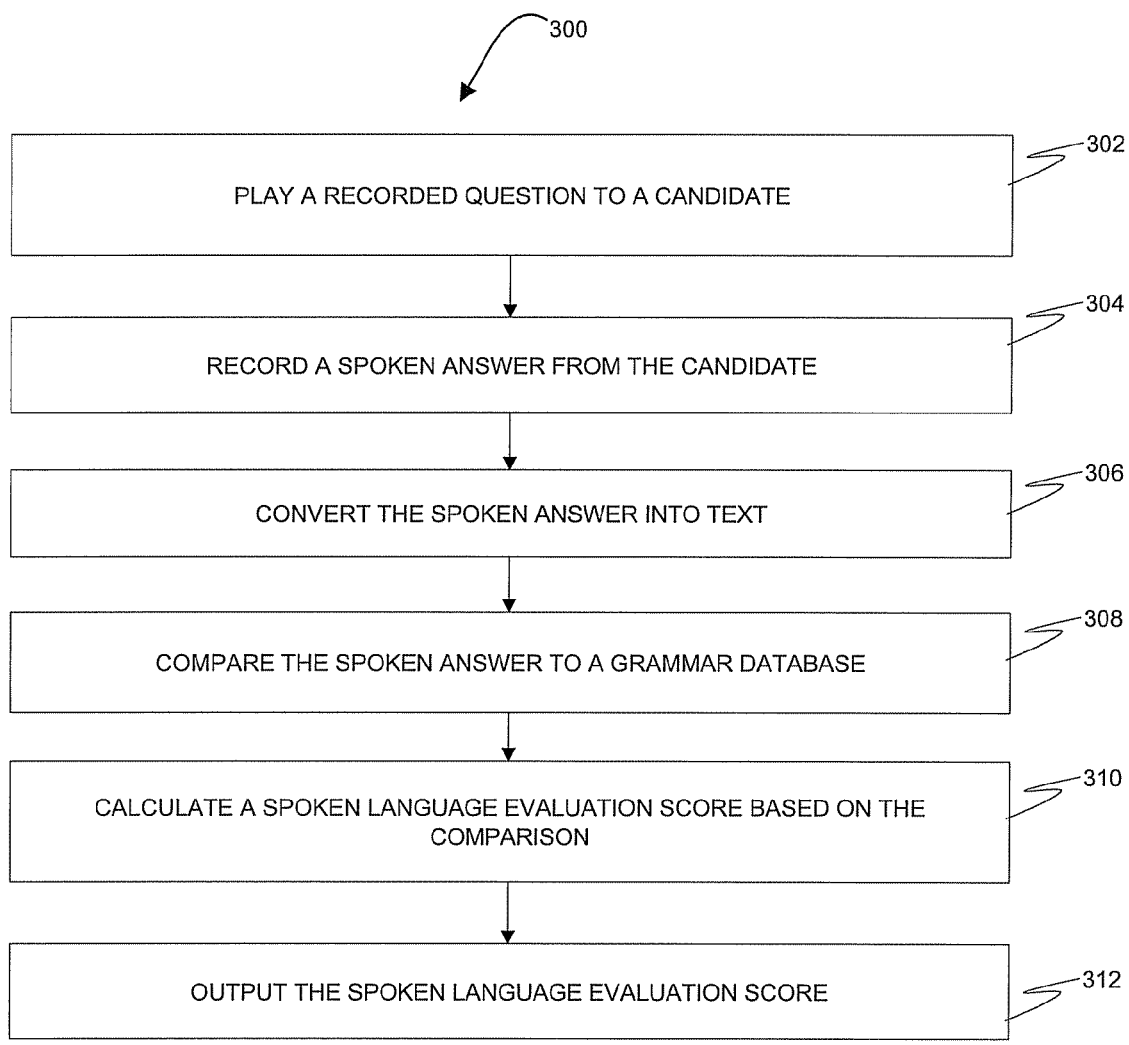
FIG. 3 illustrates one example of a flow diagram describing a process for spoken language grammar evaluation in accordance with exemplary embodiments.

Turning now to FIG. 3, a process 300 for spoken language grammar evaluation will now be described in accordance with exemplary embodiments, and in reference to the system 100 of FIG. 1. In exemplary embodiments, a candidate initiates spoken language grammar evaluation via a request from a user system 104 to the GAT 124. In response thereto, the GAT 124 sends a recorded question from the questions 114 to the user system 104. At block 302, the recorded question is played to the candidate. The candidate may listen to the recorded question as audio output through the speaker 110. In exemplary embodiments, the recorded question is a sentence containing one or more grammatical errors. The candidate is prompted to speak a corrected form of the sentence without grammatical errors.

At block 304, a spoken answer from the candidate is recorded. The spoken answer may be input through the microphone 108, transmitted to the host system 102, received by the GAT 124, and written to the candidate answers 120.

At block 306, the GAT 124 initiates the SRS 126 to convert the spoken answer from the candidate answers 120 into text. The SRS 126 may use any process known in the art to convert from recorded audio into text. In exemplary embodiments, the SRS 126 applies a limited conversion vocabulary based on the data stored in the ASR grammar 118. At block 308, the GAT 124 compares the text to the contents of the ASR grammar 118 (i.e., the grammar database). In alternate exemplary embodiments, the SRS 126 performs the comparison in block 308. The comparison matches the candidate's response with one of the possible correct answers that is present in the ASR grammar 118. If the candidate speaks a grammatically correct sentence, then the SRS 126 may correctly convert the spoken answer into text using the ASR grammar 118. If the candidate's response is not present in the ASR grammar 118, then the SRS 126 may not be able to correctly convert the spoken answer into text.

At block 310, the GAT 124 calculates a spoken language grammar evaluation score based on the comparison. In alternate exemplary embodiments, the SRS 126 performs the calculation in block 310. If the sentence recorded by the candidate (i.e., the text of the spoken answer) is one that exists in the ASR grammar 118, a higher score is assigned to the response than for an incorrect answer. If the candidate's spoken answer cannot be matched with one of the possible correct answers in the ASR grammar 118, it may be assumed that the candidate has spoken a grammatically incorrect sentence, since all of the grammatically correct possibilities are stored in the ASR grammar 118 per the process 200 of FIG. 2. A failure to locate a response in the ASR grammar 118 may result in a score of zero for the associated question. When the candidate's response is located in the ASR grammar 118, the text of the candidate's response is matched with the list of sentences from the model answers 116 to identify correct and incorrect grammar. In exemplary embodiments, the candidate is awarded a score of one for correct grammar and zero for incorrect grammar.

In determining whether a sentence is grammatically correct or incorrect, a lower grammatical word weight may be assigned for the words that do not play a critical role in making the distinction between correct and incorrect grammar. For example, the emphasized words in table 2 may be ignored or assigned a low grammatical word weight in determining whether the candidate's spoken language grammar was correct or incorrect for the given question.

TABLE 2

Words with a Lower Grammatical Word Weight in Possible Answers

| MODEL ANSWERS | CORRECT? |
|---|---|
| *I* am owning a *big car*. | No. |
| *I* own a *big car*. | Yes. |
| *I* have a *big car*. | Yes. |
| *I* owe a *big car*. | Yes. |
| *I* am driving a *big car*. | Yes. |
| *I* drive a *big car*. | Yes. |

Thus, a speech recognition error in one of the emphasized words in table 2 with a lower grammatical significance will not result in a performance degradation of the complete spoken language grammar evaluation system. This makes the process 300 for spoken language grammar evaluation robust, since it can absorb some speech recognition errors.

In exemplary embodiments, spoken language grammar evaluation includes assessing various properties in the candidate's grammar such as use of articles, prepositions, subject-verb-agreement, and word order. In order to evaluate such properties of the candidate's grammar, a response to a large number of questions 114, e.g., twenty or more, are sought from the candidate. The questions 114 are designed to cover the various properties of the candidate's grammar. Further, the method of calculating a final score from the individual scores for each question may be based on the ability to differentiate between "good" candidates and "bad" candidates. Good candidates are those who are strong in grammar (e.g., more correct answers), and bad candidates are those who are weak in grammar (e.g., fewer correct answers) as identified through evaluation performance results. In order to identify which of the questions 114 are most valuable in terms of differentiating multiple candidates, the input from several candidates can be selected for analysis, with the results stored in the training data 122. A training process may include evaluating the scores of multiple candidates based on a common grammar test to establish a scoring weight for the relative difficulty of various questions 114. In exemplary embodiments, the score for each question in the common grammar test is calculated by the following formula: For a given question q: Let a be the number of candidates that are able to answer it correctly, and their score in the grammar test is $>=3$. Let b be the number of candidates that are not able to answer it correctly, and their score in the grammar test is $<=1$. Let c be the number of candidates that are able to answer it correctly, but their score in the grammar test is $<=1$. Let d be the number of users that are not able to answer it correctly, but their score in the grammar test is $>=3$. The score for this question q is given by the equation: $[a+b-(c+d)]/[a+b+c+d]$. This formulation assumes that there are five categories in which the candidates are evaluated (0, 1, 2, 3, 4—with 4 being the best).

Similar formulations for the other categories can be calculated by modifying the equation and threshold values. This formulation is based on weighting that emphasizes questions that are answered correctly by candidates who primarily get high scores OR that are answered incorrectly by candidates who primarily get low scores. In exemplary embodiments, the training process generates a set of weights for each question, which are stored in the training data 122. The training data 122 can be manually verified to ensure that it is accurate.

At block 312, the GAT 124 outputs the spoken language grammar evaluation score. The GAT 124 may also output a summation of the weighted spoken language grammar evaluation scores for the candidate as the weighted sum of each question attempted by the candidate, applying the weights calculated in the training data 122.

Technical effects of exemplary embodiments include spoken language grammar evaluation of a candidate. A weighted score for a candidate can be calculated to establish the relative performance of the candidate as compared to other candidates. Advantages of exemplary embodiments include performing a grammar evaluation as a spoken response to a predetermined question to enhance a candidate's spontaneity and just-in-time sentence composition ability without visual assistance. Further advantages include applying a grammatical word weight to determine the grammatical correctness of the candidate's spoken answer by reducing the effect of speech recognition errors in words that are deemed non-critical to the grammar evaluation.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for spoken language grammar evaluation, comprising:
   receiving a spoken utterance;
   determining, with a speech recognition engine, a speech recognition result for the spoken utterance;
   comparing, by at least one processor, the speech recognition result with a plurality of entries in a grammar data set, wherein at least one of the plurality of entries in the grammar data set is associated with a grammatical correctness indication;
   determining a spoken language grammar evaluation score based on the comparison, wherein the spoken language grammar evaluation score represents a grammatical correctness of the spoken utterance; and
   outputting the spoken language grammar evaluation score.

2. The method of claim 1 further comprising:
   developing the grammar data set, including:
   selecting a question;
   identifying possible correct and incorrect text answers to the question as model answers; and
   storing the model answers to the grammar data set; and
   creating an audio recording of the selected question.

3. The method of claim 1, further comprising:
   playing a recorded question; and
   receiving the spoken utterance in response to playing the recorded question.

4. A method for spoken language grammar evaluation comprising:
   playing a recorded utterance to a candidate, wherein the recorded utterance is designed to prompt the candidate for a response;
   recording a spoken response from the candidate;
   converting the spoken response into text;
   comparing the text to a grammar data set;
   calculating, by at least one processor, a spoken language grammar evaluation score based on the comparison;
   outputting the spoken language grammar evaluation score;
   determining training data as a collection of candidate responses to a plurality of utterances, wherein the plurality of utterances are designed to cover multiple grammar properties;
   storing the training data;
   calculating an utterance weight for the plurality of utterances as a function of test data from a plurality of candidates, wherein the plurality of candidates includes a mix of candidates that are identified as weak and strong in grammar;
   calculating a weighted spoken language grammar evaluation score as a function of the utterance weight; and
   outputting a summation of the weighted spoken language grammar evaluation scores for the candidate.

5. The method of claim 1 wherein comparing the speech recognition result to the plurality of entries in the grammar data set comprises:
   performing a weighted word matching of the speech recognition result to the grammar data set, wherein a word with a lower grammatical significance has a low grammatical word weight, such that a failure to recognize the word with the low grammatical word weight does not directly result in an incorrect grammar determination.

6. The method of claim 1 wherein the grammar data set includes at least one grammatically incorrect entry.

7. The method of claim 1, further comprising:
receiving a plurality of spoken utterances;
determining a spoken language grammar evaluation score for at least two of the plurality of spoken utterances; and
determining a final score based, at least in part, on the spoken language grammar evaluation scores determined for the at least two of the plurality of spoken utterances.

8. The method of claim 4, wherein the recorded utterance is a question and the spoken response is an answer to the question.

9. A system for spoken language grammar evaluation, comprising:
a grammar data set, wherein at least one entry in the grammar data set is associated with a grammatical correctness indication; and
a host system in communication with the grammar data set, the host system having a grammar assessment tool (GAT) executing thereon, the GAT being configured to perform a method comprising:
receiving a spoken utterance;
initiating a determination, of a speech recognition result for the spoken utterance;
comparing the speech recognition result to a plurality of entries in the grammar data set;
determining a spoken language grammar evaluation score based on the comparison, wherein the spoken language grammar evaluation score represents a grammatical correctness of the spoken utterance; and
outputting the spoken language grammar evaluation score.

10. The system of 9 wherein the grammar data set is developed by a method comprising:
selecting a question;
identifying possible correct and incorrect text answers to the question as model answers; and
storing the model answers to the grammar data set.

11. The system of claim 9, wherein the method further comprises:
playing a recorded question; and
receiving the spoken utterance in response to playing the recorded question.

12. The system of claim 9 wherein comparing the speech recognition result to the plurality of entries in the grammar data set comprises:
performing a weighted word matching of the speech recognition result to the grammar data set, wherein a word with a lower grammatical significance has a low grammatical word weight, such that a failure to recognize the word with the low grammatical word weight does not directly result in an incorrect grammar determination.

13. The system of claim 9 wherein the grammar data set includes at least one grammatically incorrect entry.

14. The system of claim 9 further comprising:
a speech recognition system (SRS) executing upon the host system, wherein the SRS determines the speech recognition result.

15. A system for spoken language grammar evaluation, comprising:
training data, wherein the training data is determined as a collection of candidate responses to a plurality of utterances designed to cover multiple grammar properties;
a grammar data set; and
a host system in communication with the grammar data set, the host system having a grammar assessment tool (GAT) executing thereon, the GAT being configured to perform a method comprising:
sending a recorded utterance to a candidate, wherein the recorded utterance is designed to prompt the candidate for a response;
receiving a spoken response from the candidate;
initiating a conversion of the spoken response into text;
comparing the text to the grammar data set;
calculating a spoken language grammar evaluation score based on the comparison;
outputting the spoken language grammar evaluation score;
calculating an utterance weight for the plurality of utterances as a function of test data from a plurality of candidates, wherein the plurality of candidates includes a mix of candidates that are identified as weak and strong in grammar;
calculating a weighted spoken language grammar evaluation score as a function of the utterance weight; and
outputting a summation of the weighted spoken language grammar evaluation scores for the candidate.

16. The system of claim 15, wherein the recorded utterance is a question and the spoken response is an answer to the question.

17. A non-transitory computer-readable storage medium encoded with a plurality of instructions that, when executed by a processing circuit perform a method comprising:
receiving a spoken utterance;
determining a speech recognition result for the spoken utterance;
comparing the speech recognition result with a plurality of entries in a grammar data set, wherein at least one of the plurality of entries in the grammar data set is associated with a grammatical correctness indication;
determining a spoken language grammar evaluation score based on the comparison, wherein the spoken language grammar evaluation score represents a grammatical correctness of the spoken utterance; and
outputting the spoken language grammar evaluation score.

18. The storage medium of claim 17, wherein the method further comprises:
playing a recorded question; and
receiving the spoken utterance in response to playing the recorded question.

19. The storage medium of claim 17 wherein comparing the speech recognition result to the plurality of entries in the grammar data set comprises:
performing a weighted word matching of the speech recognition result to the grammar data set, wherein a word with a lower grammatical significance has a low grammatical word weight, such that a failure to recognize the word with the low grammatical word weight does not directly result in an incorrect grammar determination.

20. The storage medium of claim 17 wherein the grammar data set includes at least one grammatically incorrect entry.

21. The storage medium of claim 17 wherein the method further comprises:
receiving a plurality of spoken utterances;
determining a spoken language grammar evaluation score for at least two of the plurality of spoken utterances; and
determining a final score based, at least in part, on the spoken language grammar evaluation scores determined for the at least two of the plurality of spoken utterances.

22. A non-transitory computer-readable storage medium encoded with a plurality of instructions that, when executed by a processing circuit, perform a method comprising:
sending a recorded utterance to a candidate, wherein the recorded utterance is designed to prompt the candidate for a response;

receiving a spoken response from the candidate;
initiating a conversion of the spoken response into text;
comparing the text to a grammar data set;
calculating a spoken language grammar evaluation score based on the comparison; outputting the spoken language grammar evaluation score;
determining training data as a collection of candidate responses to a plurality of utterances, wherein the plurality of utterances are designed to cover multiple grammar properties;
storing the training data;
calculating an utterance weight for the plurality of utterances as a function of test data from a plurality of candidates, wherein the plurality of candidates includes a mix of candidates that are identified as weak and strong in grammar;
calculating a weighted spoken language grammar evaluation score as a function of the utterance weight; and
outputting a summation of the weighted spoken language grammar evaluation scores for the candidate.

23. The storage medium of claim 22, wherein the recorded utterance is a question and the spoken response is an answer to the question.

\* \* \* \* \*